US008863026B2

(12) United States Patent
Yamada et al.

(10) Patent No.: US 8,863,026 B2
(45) Date of Patent: Oct. 14, 2014

(54) DEVICE AND METHOD FOR DISPLAYING INFORMATION ON A GRAPHICAL USER INTERFACE

(75) Inventors: Kazuhiro Yamada, Yokohama (JP); Eiju Yamada, Yokohama (JP); Dai Kamiya, Tokyo (JP); Izua Kano, Yokohama (JP); Keiichi Murakami, Tokyo (JP); Yasushi Onda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 239 days.

(21) Appl. No.: 12/811,761

(22) PCT Filed: Dec. 22, 2008

(86) PCT No.: PCT/JP2008/073340
§ 371 (c)(1),
(2), (4) Date: Sep. 9, 2010

(87) PCT Pub. No.: WO2009/087891
PCT Pub. Date: Jul. 16, 2009

(65) Prior Publication Data
US 2011/0004844 A1    Jan. 6, 2011

(30) Foreign Application Priority Data

Jan. 7, 2008    (JP) .................................. 2008-000763

(51) Int. Cl.
*G06F 3/0481*    (2013.01)
*G06F 9/44*      (2006.01)
*G09G 5/14*      (2006.01)

(52) U.S. Cl.
CPC ............ *G06F 9/4443* (2013.01); *G06F 3/0481* (2013.01); *G09G 5/14* (2013.01)
USPC ............ 715/794; 715/781; 715/790; 715/788

(58) Field of Classification Search
CPC .................................................. G06F 3/0481
USPC ........................................................ 715/794
See application file for complete search history.

(56) References Cited

U.S. PATENT DOCUMENTS 4,769,636 A * 9/1988 Iwami et al. ................... 715/790
4,806,919 A * 2/1989 Nakayama et al. ........... 715/790
(Continued)

FOREIGN PATENT DOCUMENTS

GB    2302423 A    1/1997
JP    05274106     10/1993
(Continued)

OTHER PUBLICATIONS

Office Action issued by Chinese Patent Office for CN 200880124277.8 dated Nov. 17, 2011.
(Continued)

*Primary Examiner* — Matt Kim
*Assistant Examiner* — Mahelet Shiberou
(74) *Attorney, Agent, or Firm* — MKG, LLC

(57) ABSTRACT

To control display or hiding of windows simultaneously available based on a configuration used by a user. An information-processing device according to the present invention identifies applications that the device is able to execute; and when an instruction to display a window (a subject window) is performed, the device obtains a relevance information list of applications to display the subject window (subject applications). In the relevance information list, information for determining an application relating to the subject application is described. The information-processing device determines whether an application described in the relevance information list is included in the executable applications, and if it is included in the executable applications, the device displays a window of the application (a simultaneous display window) together with the subject window. Also, when the information-processing device receives an instruction to hide the subject window, the device hides the subject window and the simultaneous display window.

18 Claims, 2 Drawing Sheets

(56) References Cited

U.S. PATENT DOCUMENTS

| | | | |
|---|---|---|---|
| 5,642,498 A * | 6/1997 | Kutner | 345/547 |
| 5,694,561 A | 12/1997 | Malamud et al. | |
| 5,742,778 A | 4/1998 | Hao et al. | |
| 5,856,826 A | 1/1999 | Craycroft | |
| 6,137,490 A * | 10/2000 | Shishido | 345/690 |
| 6,753,890 B2 * | 6/2004 | Sanbe | 715/788 |
| 7,146,193 B2 * | 12/2006 | Shitahaku | 455/566 |
| 7,168,048 B1 * | 1/2007 | Goossen et al. | 715/797 |
| 7,283,036 B2 * | 10/2007 | Chen | 340/10.34 |
| 7,581,192 B2 * | 8/2009 | Stabb et al. | 715/781 |
| 2003/0227468 A1 * | 12/2003 | Takeda | 345/619 |
| 2004/0066414 A1 * | 4/2004 | Czerwinski et al. | 345/781 |
| 2005/0149879 A1 * | 7/2005 | Jobs et al. | 715/796 |
| 2005/0235214 A1 * | 10/2005 | Shimizu et al. | 715/740 |
| 2006/0044283 A1 * | 3/2006 | Eri et al. | 345/173 |
| 2006/0224991 A1 * | 10/2006 | Stabb et al. | 715/781 |
| 2007/0139372 A1 * | 6/2007 | Swanburg et al. | 345/156 |
| 2007/0178889 A1 * | 8/2007 | Cortegiano et al. | 455/414.3 |
| 2009/0013282 A1 * | 1/2009 | Mercer | 715/788 |
| 2009/0138811 A1 * | 5/2009 | Horiuchi et al. | 715/768 |
| 2009/0288036 A1 * | 11/2009 | Osawa et al. | 715/794 |
| 2011/0102386 A1 * | 5/2011 | Sahashi | 345/204 |
| 2011/0119622 A1 * | 5/2011 | Niki et al. | 715/788 |
| 2011/0119710 A1 * | 5/2011 | Jang et al. | 725/41 |

FOREIGN PATENT DOCUMENTS

| | | |
|---|---|---|
| JP | 09-081348 | 3/1997 |
| JP | 2009-81348 A | 3/1997 |
| JP | 09106337 | 4/1997 |
| JP | 10260810 | 9/1998 |
| JP | 2005275936 | 6/2005 |
| JP | 2007249944 | 9/2007 |
| JP | 2007323618 | 12/2007 |

OTHER PUBLICATIONS

Office Action issued by EPO for EP 08 869 369.2-1243 dated Nov. 10, 2011.
Japanese Office Action for JP2008-000763 dated May 31, 2011.
EP Application No. 08869369.2-1243, Supplemental European Search Report; Date Mailed Jul. 11, 2011.

* cited by examiner

FIG. 1
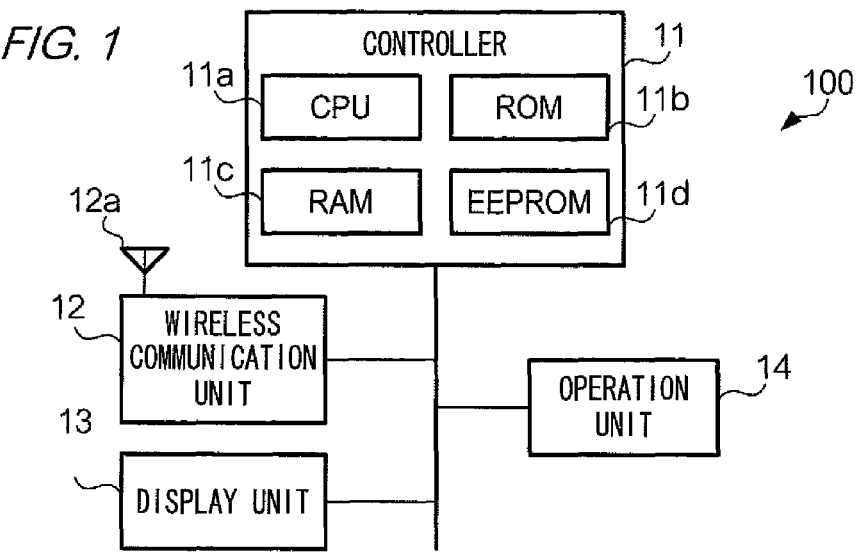
FIG. 2
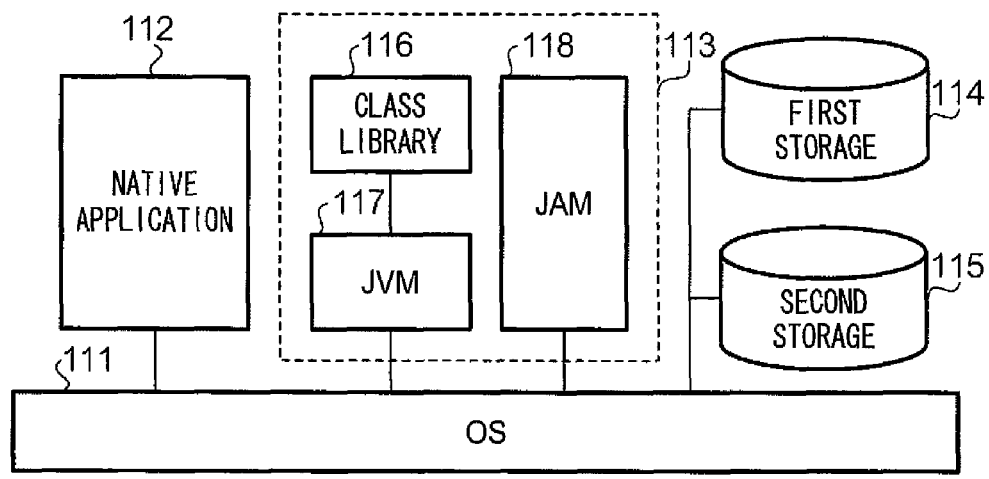
FIG. 3
| NAME | PRIORITY LEVEL |
|---|---|
| APPLICATION B | 1 |
| APPLICATION C | 2 |
| APPLICATION D | 3 |
| APPLICATION E | 4 |

DEVICE AND METHOD FOR DISPLAYING INFORMATION ON A GRAPHICAL USER INTERFACE

FIELD

The present invention relates to a GUI (Graphical User Interface).

BACKGROUND ART

In a so-called multi-window system for displaying plural windows, windows to be displayed vary according to each user or each usage situation of a user. If plural windows are to be simultaneously displayed, a user is required to perform appropriate operations to display or hide these windows (include minimization and iconization). Particularly, in a small information-processing device, such as a mobile phone, which does not have a pointing device such as a mouse, such an operation is more complicated.

JP-A-10-260810 or JP-A-5-274106 describes a technique for controlling display of plural windows. JP-A-10-260810 describes a technique for changing an arrangement of windows already displayed, based on a number of transitions among plural windows (a movement of a focus). JP-A-5-274106 describes a technique for displaying, when a user divides plural windows into some groups and instructs to display a window, windows belonging to an identical group at the front side of windows belonging to another group as a priority.

SUMMARY

Windows to be displayed simultaneously may be determined by a provider of applications and contents, rather than by an operation performed by a user. On the other hand, there are circumstances where displayable windows are different for each device of a user.

In view of such circumstances, the present invention has an object to control the display of windows available simultaneously or to hide the windows, based on a configuration used by a user.

A first information-processing device according to the present invention includes: controlling means for controlling execution of an application, and controlling display, on displaying means, of a window corresponding to the application; identifying means for identifying applications that the information-processing device is able to execute; receiving means for receiving an instruction to start displaying a subject window corresponding to a subject application that is one of executable applications; and obtaining means for obtaining relevance information for determining another application on the basis of the subject application; wherein when the instruction is received and if the other application determined from the obtained relevance information is included in the executable applications identified by the identifying means, the controlling means displays a window of the other application and the subject window.

A second information-processing device according to the present invention includes: controlling means for controlling execution of an application, and controlling display, on displaying means, of a window corresponding to the application; identifying means for identifying an application that the information-processing device is able to execute; receiving means for receiving an instruction to hide a subject window corresponding to a subject application that is one of executable applications, or to decrease a size of the subject window to be smaller than a default size; and obtaining means for obtaining relevance information for determining another application on the basis of the subject application; wherein when the instruction is received and if the other application determined from the obtained relevance information is included in the executable applications identified by the identifying means, the controlling means hides a window of the other application and the subject window, or decreases sizes of the windows.

In the first information-processing device according to the present invention, a configuration may be employed wherein the obtaining means obtains relevance information for determining a plurality of applications, and priority levels of the plurality of applications; and if the executable applications identified by the identifying means include a plurality of applications determined from the obtained relevance information, the controlling means displays a window having a higher priority level.

In the first information-processing device according to the present invention, a configuration may be employed wherein when the receiving means receives the instruction and if an application corresponding to the subject window or the other application has not been opened, the controlling means opens the application and displays a window corresponding to the application.

In the first information-processing device according to the present invention, a configuration may be employed wherein the receiving means receives an instruction to switch a content displayed on the subject window; the obtaining means obtains relevance information for each content that is displayed on the subject window by the subject application; and when the instruction to switch a content is received and if an application determined from first relevance information corresponding to a pre-switching content is not determined from second relevance information corresponding to a post-switching content, the controlling means hides a window corresponding to the application.

In the first information-processing device according to the present invention, a configuration may be employed wherein the receiving means includes selecting means for selecting an image displayed on the displaying means; and when the controlling means displays a predetermined image on the displaying means, and if the image is selected by the selecting means, the controlling means displays a window of the other application and the subject window.

In the second information-processing device according to the present invention, a configuration may be employed wherein the obtaining means obtains relevance information for determining a plurality of applications, and priority levels of the plurality of applications; and if the executable applications identified by the identifying means include a plurality of applications determined from the relevance information, the controlling means hides a window of an application having a higher priority level, or decreases a size of the window.

In the second information-processing device according to the present invention, a configuration may be employed wherein if the receiving means receives an instruction to hide the subject window, the controlling means closes an application corresponding to the subject window and the other application, and hides windows corresponding to the applications.

In the second information-processing device according to the present invention, a configuration may be employed wherein the receiving means includes selecting means for selecting an image displayed on the displaying means; and when the controlling means displays a predetermined image on the displaying means, and if the image is selected by the selecting means, the controlling means hides a window of the other application and the subject window, or decreases sizes of the windows.

The present invention can be provided as a program causing a computer to realize a function of the first or second information-processing device, or a recording medium such as an optical disk storing such program. Moreover, the program according to the present invention may be downloaded onto a computer through a network such as the Internet to be installed and used.

Effects of the Invention

According to the present invention, a window to be displayed (or hidden) at the same time as a subject window, display of which has been instructed, is determined from relevance information, the determination being made as to which windows of executable applications, thus windows to be displayed (or hidden) vary in accordance with a configuration used by a user. Accordingly, the present invention enables simple operation regardless of a configuration used by a user.

BRIEF DESCRIPTION OF THE DRAWINGS

FIG. 1 is a block diagram illustrating a configuration of an information-processing device according to the present invention.

FIG. 2 is a diagram illustrating a logical configuration of an information-processing device.

FIG. 3 is a diagram illustrating an example of a relevance information list.

DETAILED DESCRIPTION

Figure 4:
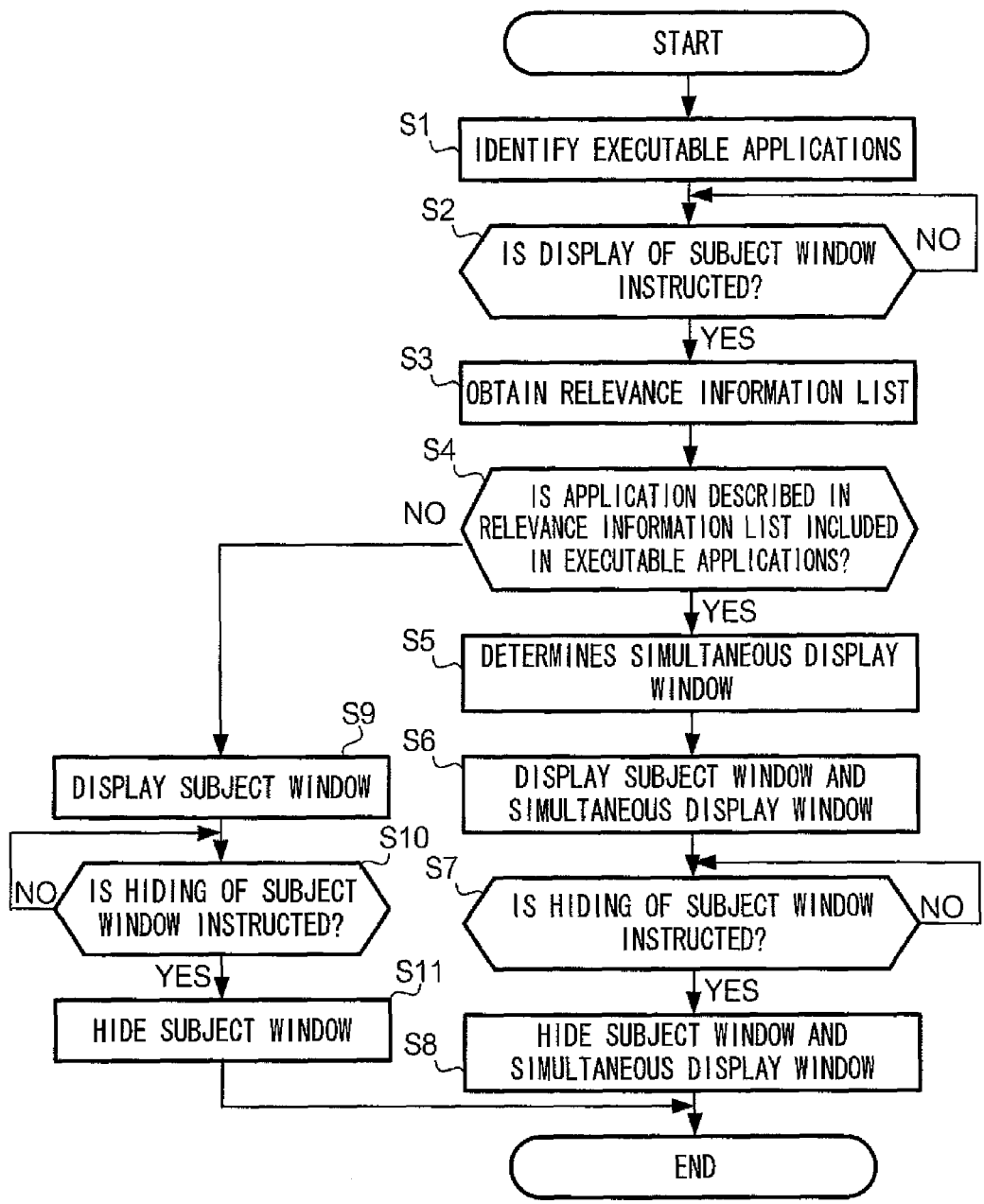
FIG. 4 is a flowchart showing an operation of an information-processing device.

Embodiments of the present invention will be described below with reference to the drawings.

Embodiment

FIG. 1 is a block diagram illustrating a configuration of information-processing device 100 according to an embodiment of the present invention. As shown in the drawing, information-processing device 100 has controller 11, wireless communication unit 12, display unit 13, and operation unit 14. Information-processing device 100 according to the present embodiment is a mobile phone with a unit for inputting and outputting voice (not shown) such as a microphone and a speaker.

Controller 11 has CPU (Central Processing Unit) 11a, ROM (Read Only Memory) 11b, RAM (Random Access Memory) 11c, and EEPROM (Electronically Erasable and Programmable ROM) 11d. CPU 11a executes a program stored in ROM 11b or EEPROM 11d while using RAM 11c as a work area, to control components of information-processing device 100. Wireless communication unit 12 has antenna 12a, and wirelessly communicates data with a predetermined mobile communication network. Display unit 13 has a liquid crystal display and a driving circuit for the liquid crystal, and displays an image in a predetermined display area on the basis of display data provided from controller 11. Operation unit 14 has plural operation keys, and provides an operation signal corresponding to a user operation to controller 11. A user can select a window or an image by operating the keys.

ROM 11b stores some programs in advance. These programs are referred to hereinafter as "preinstalled programs." Specifically, the preinstalled programs include a multitasking operating system (hereinafter referred to as "multitasking OS"), a Java (Registered Trademark) platform, and native applications. The multitasking OS is an operating system supporting various functions such as allocation of virtual memory spaces, which are necessary to realize a pseudo-parallel execution of plural tasks using a TSS (Time-Sharing System). The Java platform is a bundle of programs that are described in accordance with a CDC (Connected Device Configuration) which is a configuration for providing Java execution environment 114 (described later) in information-processing device 100 with a multitasking OS. The native applications are programs for providing basic functions of information-processing device 100 such as voice communication.

EEPROM 11d has a Java application storage area for storing Java applications. A Java application has: a JAR (Java Archive) file combined with a main program in which a processing sequence executed under the Java execution environment is described, with image files and audio files used when the main program is running; and an ADF (Application Descriptor File) in which information on installation and opening of the JAR file and various attribute information are described. A Java application is created by a content provider or a carrier, and stored in an external server device, and in response to a request from information-processing device 100, is sent to information-processing device 100 from the server device.

FIG. 2 is a diagram illustrating a logical configuration of components provided in controller 11 of information-processing device 100 through execution of programs stored in ROM 11b and EEPROM 11d. As shown in the drawing, in controller 11 executing programs, native application 112 and Java execution environment 113 are provided in OS 111. In EEPROM 11d, first storage 114 and second storage 115 are secured.

Java execution environment 113 is provided through a Java platform stored in ROM 11b. Java execution environment 113 includes class library 116, JVM (Java Virtual Machine) 117, and JAM (Java Application Manager) 118. Class library 116 is a collection file of program modules (classes) that provides a particular function. JVM 117 provides a Java execution environment optimized for the above CDC, and provides a function of interpreting and executing bytecode provided as a Java application. JAM 118 provides a function of managing download, installation, opening and closing of a Java application.

First storage 114 is a storage area for storing Java applications (JAR files and ADFs) downloaded under the control of JAM 118. Second storage 115 is a storage area for storing data that is generated during execution of a Java application after the application closes. A storage area of second storage 115 is assigned to each installed Java application. Data of a storage area assigned to a Java application can be rewritten during execution of the Java application, and cannot be rewritten by another Java application.

In the present embodiment, some applications include a list in which information for determining another application is described. The list is referred to hereinafter as "relevance information list." The relevance information list may be embedded in a program including an application, or may be stored in association with an application. "Application" referred to here may be a native application or a Java application. If it is a Java application, a relevance information list may be described in an ADF.

FIG. 3 is a diagram illustrating an example of a relevance information list. As shown in the drawing, names of applications and priority levels of the applications are associated with each other and described in the relevance information list. Here, a name of an application is an example of information for determining an application (relevance information). A priority level is a value representing a level of priority of a display of a window of an application having the associated name over a window of an application corresponding to the relevance information list. A smaller priority level value means that an application has a higher display priority.

For example, if the relevance information list shown in FIG. 3 is in correspondence with application A, this relevance information list shows that "application B" is the highest priority application for application A. In other words, application B has a higher relevance to application A than other applications (applications C, D, and E) do.

The foregoing is a description of the configuration of information-processing device 100. Information-processing device 100 with the above configuration executes plural applications on the basis of a request from a user or a status of the device. Information-processing device 100, if a predetermined condition is satisfied, executes an application corresponding to the condition. For example, if information-processing device 100 receives an instruction from a user via operation unit 14, information-processing device 100 may execute an application corresponding to the instruction. Also, when a predetermined processing (e.g., a call and so on) has ended, information-processing device 100 may execute a determined application.

Information-processing device 100 employs a multi-window system, by which it is able to display plural windows simultaneously. Here, "window" refers to a display area of display unit 13 assigned to an application.

Information-processing device 100 displays windows in an overlap window method. Specifically, information-processing device 100 is able to select and move a window in accordance with an instruction of a user, and is able to display overlapping plural windows.

When information-processing device 100 displays a certain window, information-processing device 100 refers to a relevance information list corresponding to an application used for displaying the certain window, and performs a display control to display a window of an application having a high relevance to this application simultaneously. Such display control by information-processing device 100 is specifically performed as described below.

FIG. 4 is a flow chart showing a processing performed by controller 11 of information-processing device 100. As shown in the drawing, controller 11 firstly identifies executable applications stored in the device (step S1). For example, controller 11 registers (namely stores) executable applications at a time of installation, by which it is possible to identify executable applications subsequently.

Next, controller 11 determines whether an instruction to display a window has been received (step S2). The instruction to display a window may be an instruction to open an application corresponding to the window, or may be an instruction to display a window again that has once been hidden by minimization. A window, display of which has been instructed here is referred to hereinafter as "subject window." The determination of step S2 is repeated until an instruction to display a window has been received.

When controller 11 receives an instruction to display a subject window, controller 11 determines an application corresponding to the subject window (hereinafter referred to as "subject application"), and retrieves and obtains a relevance information list having a description of the subject application (step S3). At this time, controller 11 determines an application that is described in the retrieved relevance information list, namely an application relating to the subject application.

Here, controller 11 determines whether the application described in the relevance information list is included in the executable applications identified in step S1 (step S4). Specifically, controller 11 determines whether there is an application that is identified in step S1 and is described in the retrieved relevance information list at this time. Controller 11 changes a subsequent processing depending on a result of the determination at this time.

If the application described in the relevance information list is included in the executable applications identified in step S1, controller 11 determines a predetermined number of applications that satisfy such condition in order of priority according to priority levels (step S5). A number of applications determined at this time may be one, or may be two or more. Subsequently, controller 11 displays a window corresponding to the application determined in step S5 (hereinafter referred to as "simultaneous display window") and the subject window on display unit 13 simultaneously (step S6). When an application that is to display the subject window or the simultaneous display window has not been opened, controller 11 opens the application and then displays the windows.

When the subject window and the simultaneous display window are displayed, controller 11 determines whether an instruction to hide the subject window is performed (step S7). "Hide" referred to here is a state of display when a window is closed or minimized. If controller 11 receives an instruction to hide a subject window, controller 11 hides the subject window and the simultaneous display window (step S8), and stops a display control for the subject window and the simultaneous display window.

Meanwhile, if the application described in the relevance information list is not included in executable applications identified in step S1, controller 11 newly displays only the subject window at this time (step S9). In other words, in this case there is no window that is in correspondence with the above simultaneous display window and is displayed simultaneously with the subject window. In this case, controller 11 determines whether an instruction to hide the subject window has been received (step S10), and if affirmative, hides the subject window (step S11).

As described above, when an instruction to display a window of a certain application (a subject window) is performed, information-processing device 100 according to the present embodiment displays a window of another application corresponding to the certain application (a simultaneous display window) together with the subject window. In the present embodiment, relevance among applications is determined in order of priority levels described in a relevance information list. Therefore, information-processing device 100 is able to display a different window for each device, due to executable applications stored in the device, as a simultaneous display window.

For example, it is assumed that in an example above of FIG. 3 application A is a subject window and a number of simultaneous display windows is "one." In this case, if information-processing device 100 is capable of executing applications B and C, when an instruction to display a window corresponding to application A is performed, a window corresponding to application A and a window corresponding to application B are displayed. However, if another information-processing device 100 is capable of executing application C but not application B, when an instruction to display a window corresponding to application A is performed, a window corresponding to application A and a window corresponding to application C are displayed.

In other words, according to the present embodiment, from a point of view of a content provider there is an effect of stepwisely assigning an application that the content provider desires to open together with a certain application, and opening the application based on a configuration of information-processing device 1 of a user. Therefore, a content provider can assign an optimum application to be open or closed simultaneously with a certain application, and if such an optimum application is not installed the content provider can assign the second best application. For a user of information-processing device 100, if various applications are freely installed and available, it is possible to determine a window of an application having high relevance to a subject window based on a configuration of each device, and to display or hide the windows together. Accordingly, it is possible to display plural windows available simultaneously by a small number of operations, and to improve operability of information-processing device 100 by a user.

Modifications

The present invention can be practiced as a different embodiment from the above embodiment. For example, the present invention can be practiced as an embodiment described below. Also, modifications described below may be combined with each other.

(1) Modification 1

Information for determining an application may be other than a name of the application. Information for determining an application may be, for example, information representing an application provider. In this manner, when an application provided by a provider opens, it is possible to display a window of another application provided by the same provider together. Also, information representing a genre (category) or version number of an application may be used as information for determining an application. In short, any information may be used as information for determining an application if the information is capable of distinguishing one or plural applications from other applications.

(2) Modification 2

Plural windows each may be a window displayed by each application, or a window displayed for each file by an identical application. In other words, information-processing device 100 executes plural different applications and displays windows corresponding to the applications, or executes one application and displays windows corresponding to plural different files.

(3) Modification

A subject window and a simultaneous display window may not be always displayed simultaneously. For example, controller 11 may alternate display of these windows, with an interval of time.

When controller 11 displays a subject window and a simultaneous display window, controller 11 may adjust display positions of these windows. For example, for ease of simultaneous viewing of a subject window and a simultaneous display window, controller 11 may perform an adjustment such that these windows are displayed near each other, or to avoid interfering with each display of a subject window and a simultaneous display window, controller 11 may perform an adjustment such that these windows are not overlapped.

(4) Modification 4

In the above embodiment a subject window and a simultaneous display window are displayed simultaneously, and these windows are hidden simultaneously, but the present invention may be applied to an aspect of display (or hide) only.

(5) Modification 5

An instruction to hide a window may be directly provided from a user, or may be provided owing to display of another window (other than a subject window and a simultaneous display window). For example, when another window is displayed overlapping and in front of a subject window or a simultaneous display window, the subject window and the simultaneous display window are hidden. Thus, in this case an instruction to display another window at the front is also an instruction to hide a subject window and a simultaneous display window.

(6) Modification 6

Controller 11 may display an image such as an icon and a bottom representing an instruction to display a subject window and a simultaneous display window on display unit 13 simultaneously. When the image is selected by a user, controller 11 displays every window corresponding to an instruction represented by the image.

Similarly, controller 11 may display an image representing an instruction to hide every relevant window. Such an image may be displayed at a part of a window area. For example, if a window has a quadrilateral shape, such an image may be displayed near a top of the window.

(7) Modification 7

An aspect to hide a window includes an aspect to close a corresponding application and an aspect of so-called minimization. When a window is minimized, an image such as an icon indicating that an application corresponding to the window has not closed may be displayed instead of a hidden window. Such an image may represent an instruction to display a window hidden by selection of a user again.

Instead of hiding a subject window and a simultaneous display window, controller 11 may decrease sizes of these windows. In short, when controller 11 receives an instruction from a user, controller 11 may perform a control to decrease a ratio of a subject window and a simultaneous display window to a display area of display unit 13 compared to that immediately prior to receiving the instruction, by decreasing sizes of a subject window and a simultaneous display window to be smaller than a default size, for example.

(8) Modification 8

In the above embodiment, the present invention is applied to a mobile phone, but the present invention can be applied to another information-processing device. The present invention can be applied to an information-processing device such as a communication terminal such as a PDA (Personal Digital Assistant), a camera, a portable music player, and a portable game device. An information-processing device according to the present invention may not necessarily provide a multitasking function.

What is claimed:

1. An information-processing device comprising:
a controller in communication with one or more of a display unit, a wireless communication unit, and an operation unit, the controller configured to:
control execution of a plurality of applications and control display on the display unit of a plurality of windows corresponding to the plurality of applications;
identify all of a plurality of executable applications installed in the information-processing device;
receive an instruction to start displaying a first window corresponding to a first application that is one of the identified plurality of executable applications installed in the information-processing device;

obtain a list describing a second application associated with a first priority and a third application associated with a second priority; and determine whether the second application and the third application are included in the executable applications installed in the information-processing device;

wherein when the instruction is received and the second application is included in the identified executable applications, a window of the second application and the first window are simultaneously displayed on the display unit, and wherein when the instruction is received, and the second application is not included in the identified executable applications, and the third application is included in the identified executable applications, a window of the third application and the first window are simultaneously displayed on the display unit.

2. An information-processing device comprising:

a controller in communication with one or more of a display unit, a wireless communication unit, and an operation unit, the controller configured to:

control execution of a plurality of applications and control display on a display unit of a plurality of windows corresponding to the plurality of applications;

identify all of a plurality of executable applications installed in the information-processing device;

receive a first instruction to start displaying a first window corresponding to a first application that is one of the identified plurality of executable applications installed in the information-processing device, and a second instruction to hide the first window, or to decrease a size of the first window to be smaller than a default size;

obtain a list describing a second application associate with a first priority and a third application associated with a second priority; and determine whether the second application and the third application are included in the executable applications installed in the information-processing device;

wherein when the first instruction is received and the second application is included in the identified executable applications, a window of the second application and the first window are simultaneously displayed on the display unit, and when the second instruction is received and the second application is included in the identified executable applications, the controller hides the window of the second application and the first window, or decreases sizes of the windows, wherein when the first instruction is received and the second application is not included in the identified executable applications, and the third application is included in the identified executable applications, a window of the third application and the first window are simultaneously displayed on the display unit, and when the second instruction is received and the third application is displayed, the controller hides the window of the third application and the first window, or decreases sizes of the windows.

3. The information-processing device according to claim 1, wherein:

the controller obtains a second list describing information for determining a second plurality of applications, and display priority information for the second plurality of applications; and the identified executable applications includes the second plurality of applications determined from the information described in the second list, a window having a highest display priority is displayed.

4. The information-processing device according to claim 1, wherein when the controller receives the instruction and an application corresponding to the first window or the second application has not been opened, the controller opens the application and displays a window corresponding to the application.

5. The information-processing device according to claim 1, wherein:

the controller receives an instruction to switch a content displayed on the first window;

the controller obtains information for each content that is displayed on the first window by the first application; and when the instruction to switch a content is received and an application determined from first information corresponding to a pre-switching content is not determined from second information corresponding to a post-switching content, the controller hides a window corresponding to the application.

6. The information-processing device according to claim 1, wherein:

the controller selects an image displayed on the display unit; and when the controller displays a predetermined image on the display unit, and when the image is selected, the controller displays a window of the second application and the first window.

7. The information-processing device according to claim 2, wherein:

the controller obtains a second list describing information for determining a second plurality of applications, and display priority information of the second plurality of applications; and the executable applications identified by the controller includes the second plurality of applications, the controller hides a window of an application having a highest display priority, or decreases a size of the window.

8. The information-processing device according to claim 2, wherein when the controller receives an instruction to hide the first window, the controller closes an application corresponding to the first window and the second application, and hides windows corresponding to the applications.

9. The information-processing device according to claim 2, wherein:

the controller selects an image displayed on the display unit; and when the controller displays a predetermined image on the display unit, and when the image is selected, the controller hides a window of the second application and the first window, or decreases sizes of the windows.

10. A computer program product comprising instructions on a non-transitory computer-readable medium, the computer program product for causing a computer to execute the steps of:

controlling execution of a plurality of applications, and controlling display, on a display unit, of a plurality of windows corresponding to the plurality of applications;

identifying all of a plurality of executable applications installed on the computer;

receiving an instruction to start displaying a first window corresponding to a first application that is one of the identified executable applications installed on the computer;

obtaining a list describing a second application associated with a first priority and a third application associated with a second priority;

determining whether the second application and the third application are included in the executable applications installed on the computer;

wherein when the second application is included in the identified executable applications, displaying a window of the second application simultaneously with the first window when the instruction is received, and wherein when the second application is not included in the identified executable applications and the third application is included in the identified executable applications, displaying a window of the third application simultaneously with the first window when the instruction is received.

11. A computer program product comprising instructions on a non-transitory computer-readable medium, the computer program product for causing a computer to execute the steps of:

controlling execution of a plurality of applications, and controlling display on a display unit of a plurality of windows corresponding to the plurality of applications;

identifying all of a plurality of executable applications installed on the computer;

receiving a first instruction to start displaying a first window corresponding to a first application that is one of the identified executable applications installed on the computer, and a second instruction to hide the first window, or to decrease a size of the first window to be smaller than a default size;

obtaining a list describing a second application associated with a first priority and a third application associated with a second priority;

simultaneously displaying a window of the second application and the first window when the first instruction is received and the second application is included in the identified executable applications; and hiding the window of the second application, or decreasing sizes of the windows when the second instruction is received and the second application is included in the identified executable applications, simultaneously displaying a window of the third application and the first window when the first instruction is received and the second application is not included in the identified executable applications and the third application is included in the identified executable applications;

and when the second instruction is received, hiding the window of the third application, or decreasing sizes of the windows of the first application and the third application.

12. The information-processing device according to claim 1, wherein:

the controller obtains a second list describing information for determining a second plurality of applications on the basis of the first application, and display priority information for the second plurality of applications; and the controller determines, when the second plurality of applications is included in the identified executable applications, a predetermined number of applications included in the executable applications in order of priority according to the obtained priority levels, and displays windows of the determined applications and the first window.

13. The information-processing device according to claim 1, wherein the controller adjusts display positions of the first window and the second window such that the first window and the second window do not overlap.

14. The information-processing device according to claim 2, wherein the controller adjusts display positions of the first window and the second window such that the first window and the second window do not overlap.

15. The information-processing device according to claim 1, wherein when the instruction is received and the second application is not included in the identified executable applications, the first window is displayed without the window of the second application being displayed.

16. The information-processing device according to claim 2, wherein when the instruction is received and the second application is not included in the identified executable applications, the first window is displayed without the window of the second application being displayed.

17. The computer program product according to claim 11, wherein if the second application is not included in the identified executable applications, the first window is displayed without the window of the second application being displayed.

18. The computer program product according to claim 11, wherein if the second application is not included in the identified executable applications, the first window is displayed without the window of the second application being displayed.

* * * * *